United States Patent
Xu

(10) Patent No.: US 10,406,455 B2
(45) Date of Patent: *Sep. 10, 2019

(54) FLOATING WEIR SKIMMER

(71) Applicant: DALIAN YOOQI WATER TREATMENT TECHNOLOGY CO.LTD, Dalian (CN)

(72) Inventor: Yin Xu, Dalian (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/844,546

(22) Filed: Dec. 17, 2017

(65) Prior Publication Data

US 2018/0104623 A1 Apr. 19, 2018

Related U.S. Application Data

(63) Continuation of application No. PCT/CN2016/074535, filed on Feb. 25, 2016.

(51) Int. Cl.
| | |
|---|---|
| *C02F 1/40* | (2006.01) |
| *B01D 17/032* | (2006.01) |
| *B01D 21/24* | (2006.01) |
| *E02B 15/10* | (2006.01) |
| *B01D 17/02* | (2006.01) |
| *E02B 15/04* | (2006.01) |

(52) U.S. Cl.
CPC ......... *B01D 21/24* (2013.01); *B01D 17/0214* (2013.01); *B01D 21/2433* (2013.01); *C02F 1/40* (2013.01); *E02B 15/101* (2013.01); *E02B 15/106* (2013.01); *E02B 15/048* (2013.01)

(58) Field of Classification Search
CPC ... B01D 17/0214; B01D 21/2433; C02F 1/40; E02B 15/106

USPC ................... 210/122, 242.1, 242.3, 540, 776
See application file for complete search history.

(56) References Cited

U.S. PATENT DOCUMENTS

| | | | | |
|---|---|---|---|---|
| 3,983,034 A | * | 9/1976 | Wilson ................. | E02B 15/048 210/242.3 |
| 5,601,705 A | * | 2/1997 | Glasgow ............ | B01D 21/2433 210/242.3 |
| 5,693,218 A | * | 12/1997 | Yamamoto ......... | B01D 17/0214 210/122 |

(Continued)

FOREIGN PATENT DOCUMENTS

| | | |
|---|---|---|
| CN | 101579586 A | 11/2009 |
| CN | 202227327 U | 5/2012 |

(Continued)

OTHER PUBLICATIONS

International Search Report of PCT/CN2016/074535 dated Nov. 23, 2016.

*Primary Examiner* — Christopher Upton
(74) *Attorney, Agent, or Firm* — Erson IP (Nelson IP)

(57) ABSTRACT

A floating weir skimmer comprises a collecting box (10), a weir plate (11) and an inner buoy (5). Said collecting box (10) comprises a baffle plate (3) and a trough (1). A guide rail (6) is arranged inside said trough (1). An inner buoy (5) is arranged inside collecting box (10), and a guide pulley (14) is arranged on said inner buoy (5), enabling said inner buoy (5) to slide on said guide rail (6). A supporting member is further arranged on said inner buoy (5). One end of said weir plate (11) is carried by said supporting member, and the other end is in rotation connection with said trough (1).

8 Claims, 6 Drawing Sheets

(56) References Cited

U.S. PATENT DOCUMENTS

| | | | |
|---|---|---|---|
| 6,277,273 B1* | 8/2001 | Gore | B01D 17/0214 |
| | | | 210/122 |
| 7,025,888 B2* | 4/2006 | Thompson | B01D 21/2433 |
| | | | 210/242.1 |
| 2007/0221587 A1* | 9/2007 | Tuomikoski | B01D 21/2433 |
| | | | 210/540 |
| 2008/0190834 A1* | 8/2008 | Urquhart | B01D 21/2433 |
| | | | 210/242.1 |
| 2014/0305878 A1 | 10/2014 | Plink et al. | |
| 2018/0104621 A1* | 4/2018 | Xu | B01D 21/2433 |

FOREIGN PATENT DOCUMENTS

| | | |
|---|---|---|
| CN | 205391817 U | 7/2016 |
| GB | 2330780 | 5/1999 |

\* cited by examiner

FLOATING WEIR SKIMMER

CROSS-REFERENCE TO RELATED APPLICATIONS

This application is a continuation of International Patent Application No. PCT/CN2016/074535 with a filing date of Feb. 25, 2016, designating the United States, now pending. The content of the aforementioned applications, including any intervening amendments thereto, are incorporated herein by reference.

TECHNICAL FIELD

The present invention relates to a surface liquid or scum collecting device, in particular to a floating weir skimmer.

BACKGROUND OF THE PRESENT INVENTION

Floating weir skimmer has been widely used for skimming surface liquid or scum, such as oil skimmer, decanter, oil spill skimmer, etc. Taking the oil skimmer as an example, the disadvantages of the oil skimmer in current applications includes difficulty in skimming-level adjustment, short skimming weir, narrow skimming range, and low efficiency.

The floating weir skimmer in prior art, also has problems such as narrow ranges in collecting surface liquid or scum and difficulty in liquid level control, etc. U.S. Pat. No. 6,251,466 discloses a floating skimmer which only includes a single-side weir plate, and can only collect single-side liquid. Since the floating weir floats with the help of the floater carried by the weir plate, it is difficult for an extremely long floating weir plate to achieve horizontal adjustment, leading to non-uniformly collected surface liquid or scum, high raw liquid content, and other defects. U.S. Pat. No. 5,478,483 discloses a floating weir skimmer. Although the skimmer includes two weir plates, both of the weir plates are installed on a single side, which leads the skimmer can also only collect single-side liquid. U.S. Pat. No. 3,970,556 discloses a floating weir skimmer which is also of a single-side floating weir plate. The floating weir plate of the floating weir skimmer requires external control, failing to achieve self-adjustment. All of the foregoing floating weir skimmers have defects in application, especially restrictions in collecting a large-range liquid surface. Therefore, so far a skimmer with a wide collecting range, good performance, self-adjustment of weir plate, and stable operation is needed in the art.

SUMMARY OF PRESENT INVENTION

Targeting at solving problems found in prior art, for example, failure to skim a wide range of surface liquid or scum, difficulty in controlling levels of collected surface liquid or scum, etc., the present invention provides a floating weir skimmer. Said skimmer is capable of collecting surface liquid or scum in a wide range and controlling the levels of collected surface liquid or scum by adjusting the output flow of said skimmer, and said skimmer operates stably.

In order to solve the foregoing problems, the key technical point of the present invention is to provide a floating weir skimmer including a collecting box, a weir plate and an inner buoy; said collecting box includes a baffle plate and a trough; a guide rail is arranged inside said trough; said inner buoy is arranged inside the collecting box, a guide pulley is arranged on said inner buoy, enabling said inner buoy to slide on said guide rail; a supporting member is further arranged on said inner buoy; one end of said weir plate is carried by said supporting member, and the other end is in rotation connection with said trough.

The floating skimmer in the present invention can select weir plate according to the actual liquid level during operation. The weir plate has two forms; one is a combination of rotation plate and multi-opening weir plate, the other is a rotation plate carrying a weir crest. For a wide liquid surface, the combination of rotation plate and multi-opening weir plate will be selected, with a length generally up to more than 2 m, even up to more than 80 m in maximum. For a narrow liquid surface, the rotation plate carrying a weir crest will be selected, with length of 0.2-2 m.

When the weir plate is a rotation plate carrying a weir crest, said weir plate comprises a rotation plate, a weir crest and a weir; one end of said rotation plate is in rotation connection with the trough, and the other end is provided with a weir crest and a weir; the rotation plate is carried by a supporting member.

When the weir plate is a combination of rotation plate and multi-opening weir plate, said weir plate comprises a rotation plate and a multi-opening weir plate; said rotation plate comprises a rotating, part and a supporting part, one end of said rotating part is in rotation connection with the trough, and the other end is connected with the multi-opening weir plate: said supporting part is carried by a supporting member.

Further, said weir crest and said weir are alternatively arranged on said multi-opening weir plate; a long round opening adjusting the height of said weir crest is further arranged on said multi-opening weir plate.

Said rotation plate may be a straight plate or a bending plate, which is not specifically limited in the present invention.

The operation of the floating skimmer in the present invention may vary according to the scum on the actual liquid surface, and said weir plate may be a single-side weir plate or a double-side weir plate.

When the weir plate is a single-side weir plate, one side of the collecting box is provided with said weir plate, and the other side is enclosed.

When the weir plate is a double-side weir plate, both sides of the collecting box will be provided with said weir plate, and the height of weir plates on both sides can be independently adjusted. The independent adjustment means the heights of the weir plates on the two sides may be adjusted separately: for example, when more scum is found on the left side surface and less scum is found on the right side surface, a combination of weir plates where the left one is lower and the right one is higher can be adopted. The prior art fails to provides any skimmer having a combination of weir plates which can achieve adjustment at any time towards different surface liquid or scum.

The supporting member in the floating weir skimmer in the present invention may be any type of supporting structure known in this field, such as bolts, slide blocks, screws, and pins or any combination of them, which is not specifically qualified by the present invention. But preferably, the supporting member in the present invention includes an adjustable bolt and a carrying block, and said adjustable bolt is fixed on an inner buoy; one end of said carrying block is arranged on said adjustable bolt, moving up and down with said adjustable bolt, and the other end of said carrying block is in sliding connection with the supporting part of the rotation plate.

Further, a liquid outlet is further arranged on said collecting box. Said liquid outlet may be arranged at any position on said collecting box, which is not specifically qualified by the present invention. When it is not suitable to arrange a liquid outlet on said collecting box, a pump may be used at the top, of said collecting box for pumping the liquid in said collecting box.

Further, the number of said inner buoy is at least one. Either one inner buoy or a combination of more than one buoy is acceptable according to treatment demands.

The connection method between said rotation plate and said trough may be any type of rotation connection, such as swing connection, hinge connection, pivot connection and spherical surface rotation. In the present invention, hinge connection is used for connection between said rotation plate and said trough.

The floating weir skimmer in the present invention may be of fixed installation or may float on liquid surface with a buoy installed on the outside of said floating weir skimmer.

Compared with prior art, the present invention has the following beneficial effects:

The present invention employs an inner buoy to carry the weir plate, solving the problems of failure to skim a wide range of surface liquid or scum and difficulty in controlling, levels of collected surface liquid or scum; different combinations of weir plates can be used for different situations of surface liquid and scum, showing a wide scope of application; the clear design of the inner buoy solves the problem in prior art that it is difficult for a long weir plate to maintain level; besides, the present invention uses a multi-opening weir plate, which increases the flowing speed of the collected liquid or scum, thus increasing the concentration of the skimmed liquid; the length of weir plates is not limited, which can be determined according to the length of the liquid surface to be pre-treated, increasing the skimming efficiency; the floating skimmer in the present invention sees a wide range of collection, high working efficiency, stable running, easy and reliable operation and control.

Figure 1:
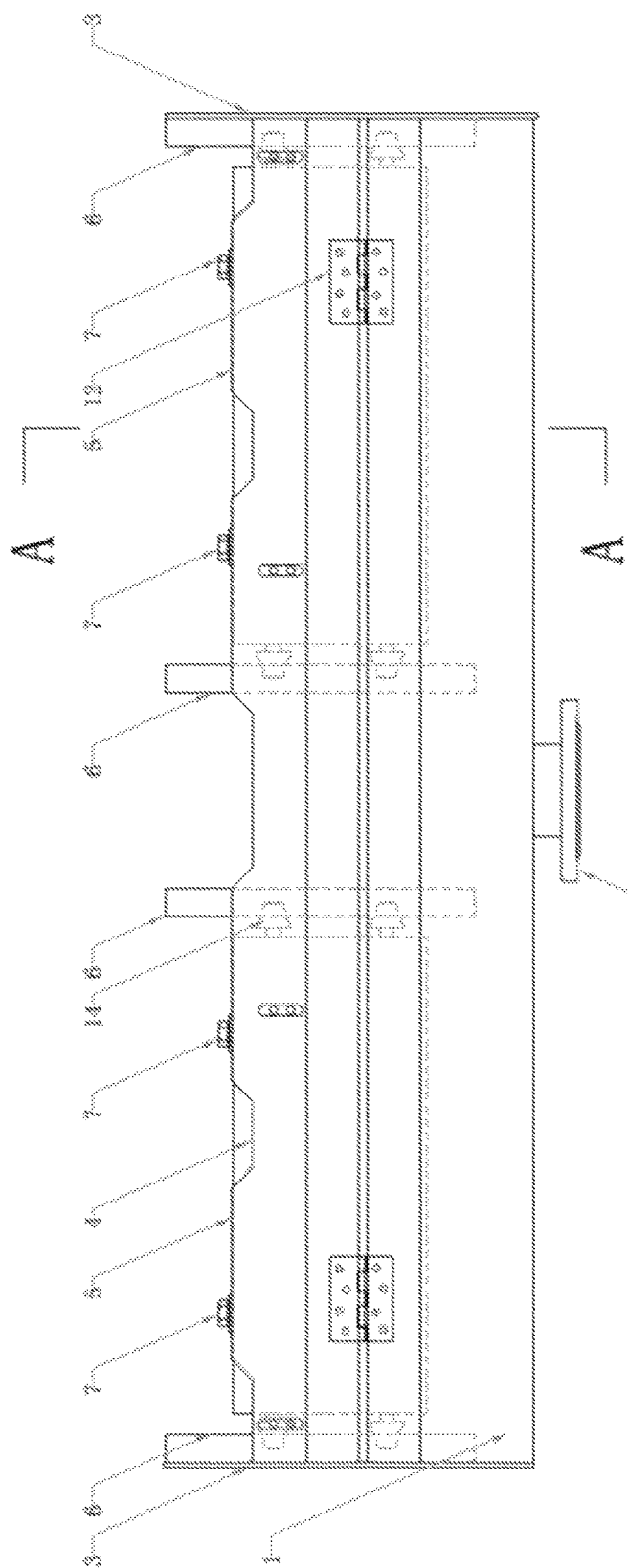
FIG. 1 is a front view of a skimmer according to Embodiment 1 of the present invention.
Figure 2:
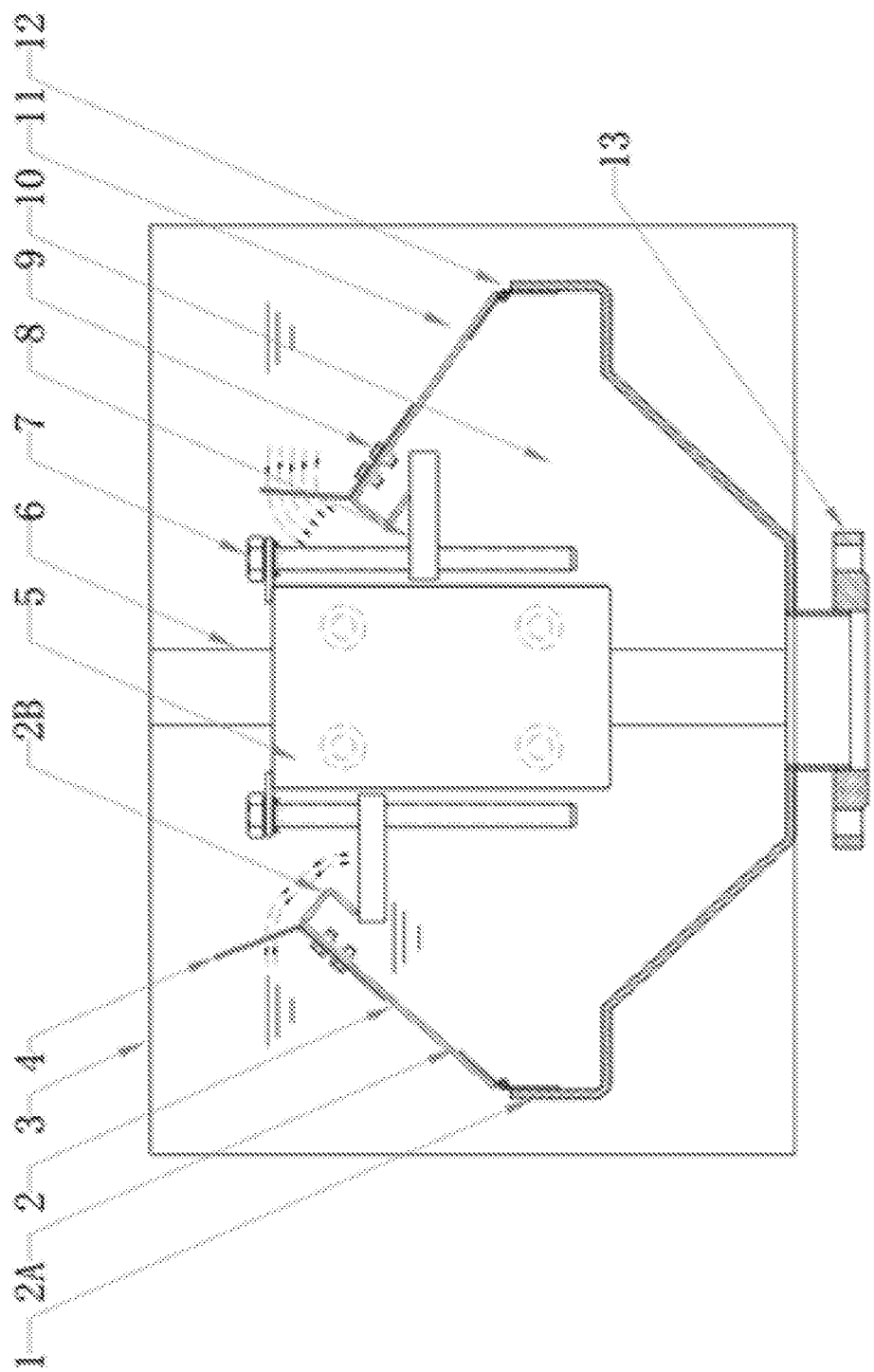
FIG. 2 is a sectional view along line A-A of FIG. 1.

In the figures, 1. trough; 2. rotation plate; 2A. rotating part; 2B. supporting part; 3. baffle plate; 4. multi-opening weir plate; 5. inner buoy; 6. guide rail; 7. adjustable bolt; 8. carrying block; 9. bolt; 10. collecting box; 11. weir plate; 12. hinge; 13. liquid outlet; 14. guide pulley; 15. weir crest; 16. weir; 17. long round opening.

DETAILED DESCRIPTION OF PREFERRED EMBODIMENTS

The present invention is described in further detail with reference to the drawings and embodiments as follows. The following embodiments are used to illustrate the present invention, but not intended to limit the scope of the present invention.

Embodiment 1

As shown in FIGS. 1-5, the floating weir skimmer is a combination of double-side weir plate and double inner buoys. The collecting box 10 includes two baffle plates 3 and one trough 1. A guide rail 6 is arranged inside said trough 1. A quadrangular inner buoy 5 is arranged inside said collecting box 10. Both ends of said inner buoy 5 are provided with a guide pulley 14. The inner buoy floats with the help of the liquid buoyancy in said collecting box 10. The level changes in said collecting box 10 enables said inner buoy 5 to float along said guide rail 6 relying on said guide pulley 14. An adjustable bolt 7 is fixed on both sides of said inner buoy 5. A carrying block 8 is arranged on said adjustable bolt 7. Positions and heights of said carrying blocks 8 on the left and the right sides of said inner buoy 5 may be different. Said carrying block 8 on the left side is slightly higher than said carrying block 8 on the right side.

In this embodiment, the weir plate 11 is a double-side weir plate, namely, both sides of the inner buoy 5 are provided with the weir plate 11. Said weir plate 11 includes a rotation plate 2 and a multi-opening weir plate 4. Said rotation plate 2 consists of a rotating part 2A and a supporting part 2B. One end of said rotating part 2A is in rotation connection with the trough 1. Said rotation connection may be other connection methods conventionally used in this field as long as the rotation of said rotation plate 2 can be achieved, hinge connection is preferred in this embodiment, namely connection through hinges. The other end of said rotating part 2A is in fixed connection with said multi-opening weir plate 4 by the bolt 9. Said supporting part 2B presses on the carrying block 8 relying on its own gravity and moves with said carrying block 8 moving up and down. Weir crests 15 and weirs 16 are alternatively arranged on said multi-opening weir plate 4. Since said multi-opening weir plate 4 is extremely long, making it not easily to be controlled within a same level. A long round opening 17 adjusting the height of the weir crest 15 is further arranged on said multi-opening weir plate 4. A liquid outlet 13 is arranged at the bottom of the collecting box 10.

When collecting scum, the liquid outlet 13 is opened. The liquid level in the collecting box 10 will decrease; the inner buoy 5 will float due to changes of liquid level in the collecting box 10. The inner buoy 5 moves downwards, driving the adjustable bolt 7 and the carrying block 8 to also move downwards. The rotation plate 2 rotates, driving the multi-opening weir plate 4 to rotate. The scum outside the trough 1 will enter the collecting box 10 through the weir crest 15. After finishing collection, the liquid outlet 13 is closed. The inner buoy 5, the rotation plate 2 and the multi-opening weir plate 4 will return to their original positions.

Figure 3:
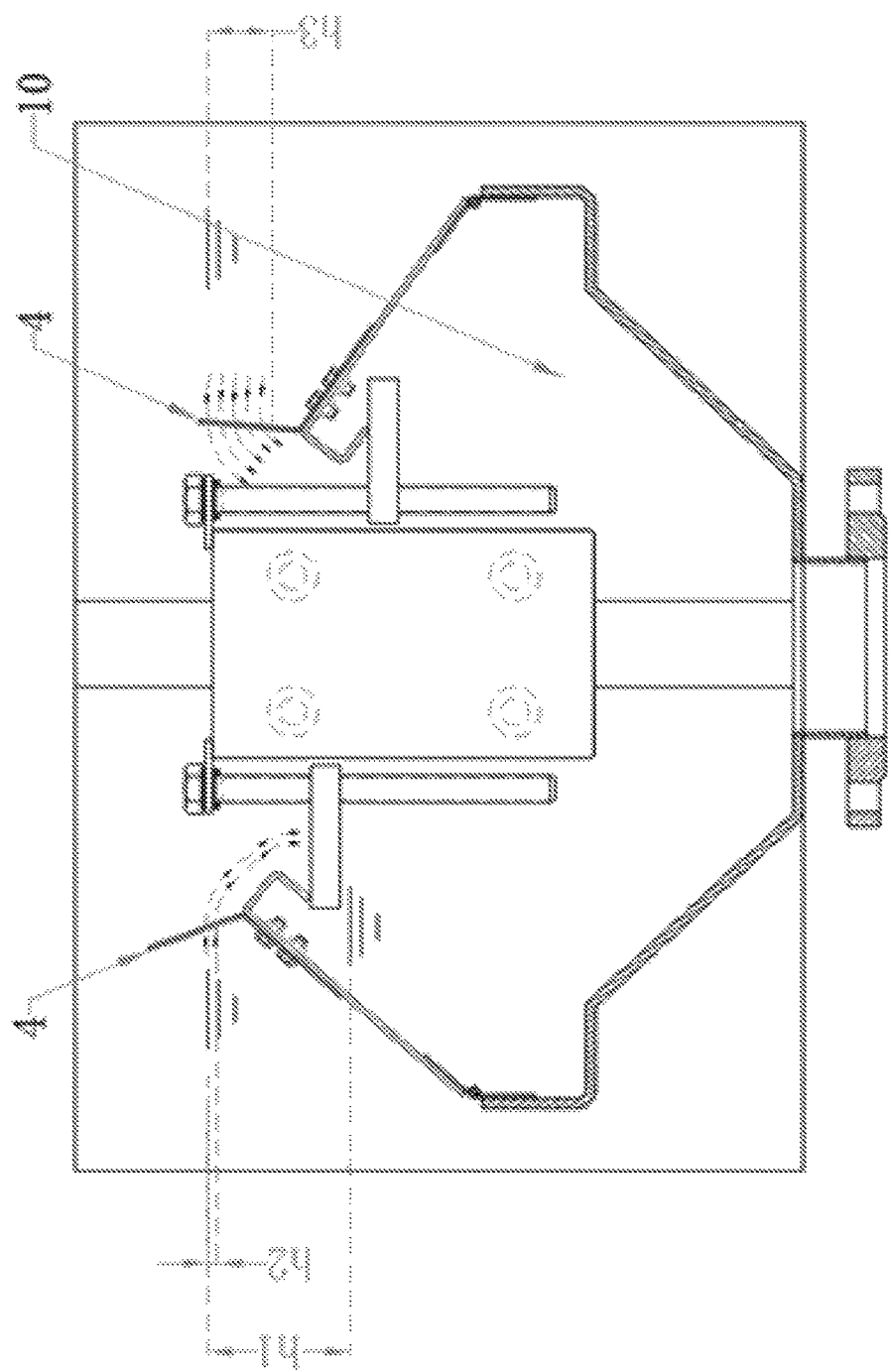
FIG. 3 is a schematic diagram for self-adjustment of floating weir.
Figure 4:
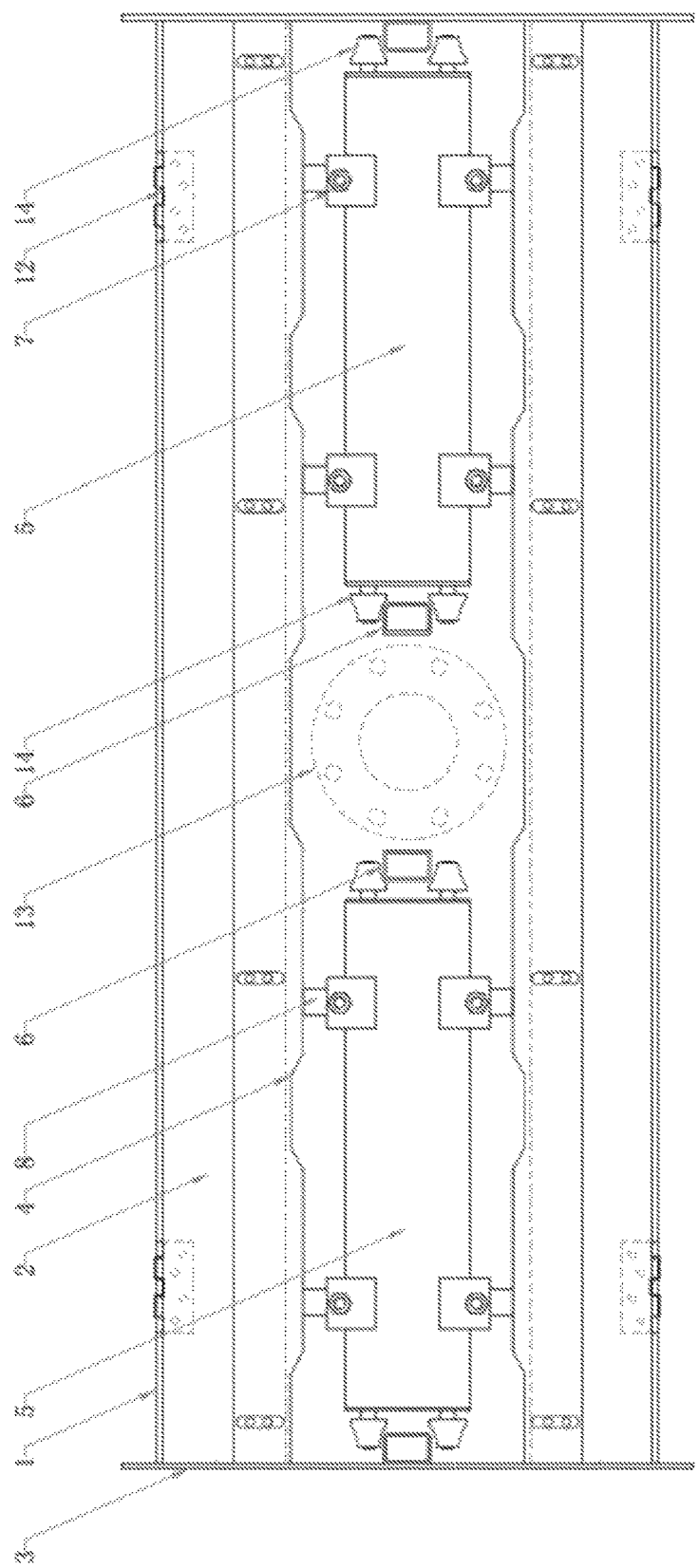
FIG. 4 is a top view of FIG. 1.
Figure 5:
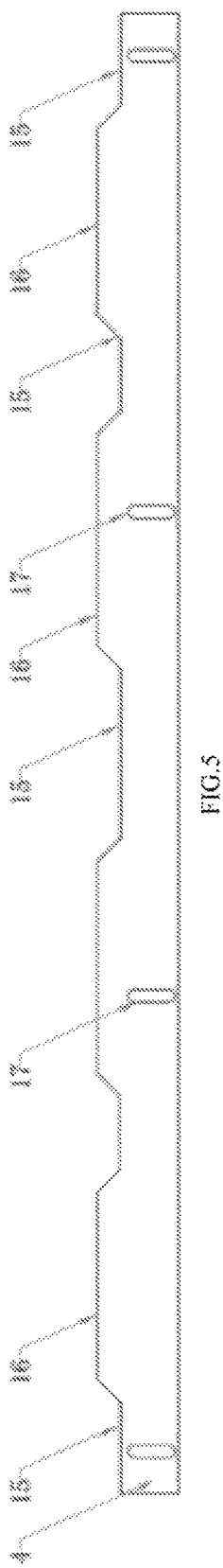
FIG. 5 is a structural diagram of a multi-opening weir plate.

The operating principle of the self-adjustment of weir plate in the floating weir skimmer is as follows. As shown in FIG. 3, when the level in the collecting box 10 decreases due to discharge, the level difference h1 between the inside and the outside increases, and the inner buoy 5 moves downwards, driving the multi-opening weir plate 4 to also move downwards while rotating around the hinge 12. The heights h2 and h3 of the weir crests 15 on the left and the right sides relative to the liquid level increase, and the amount of collected surface liquid or scum increases. As the discharge h1 changes, the heights h2 and h3 of collected surface liquid or scum also change, achieving the purpose of automatically controlling the collection level by only controlling the output flow. The heights h2 and h3 of the weir crests 15 on the left and the right sides relative to the liquid level may be preset by the carrying block 8 on the left and the right sides according to, the situation of the collected surface liquid or scum.

Embodiment 2

Figure 6:
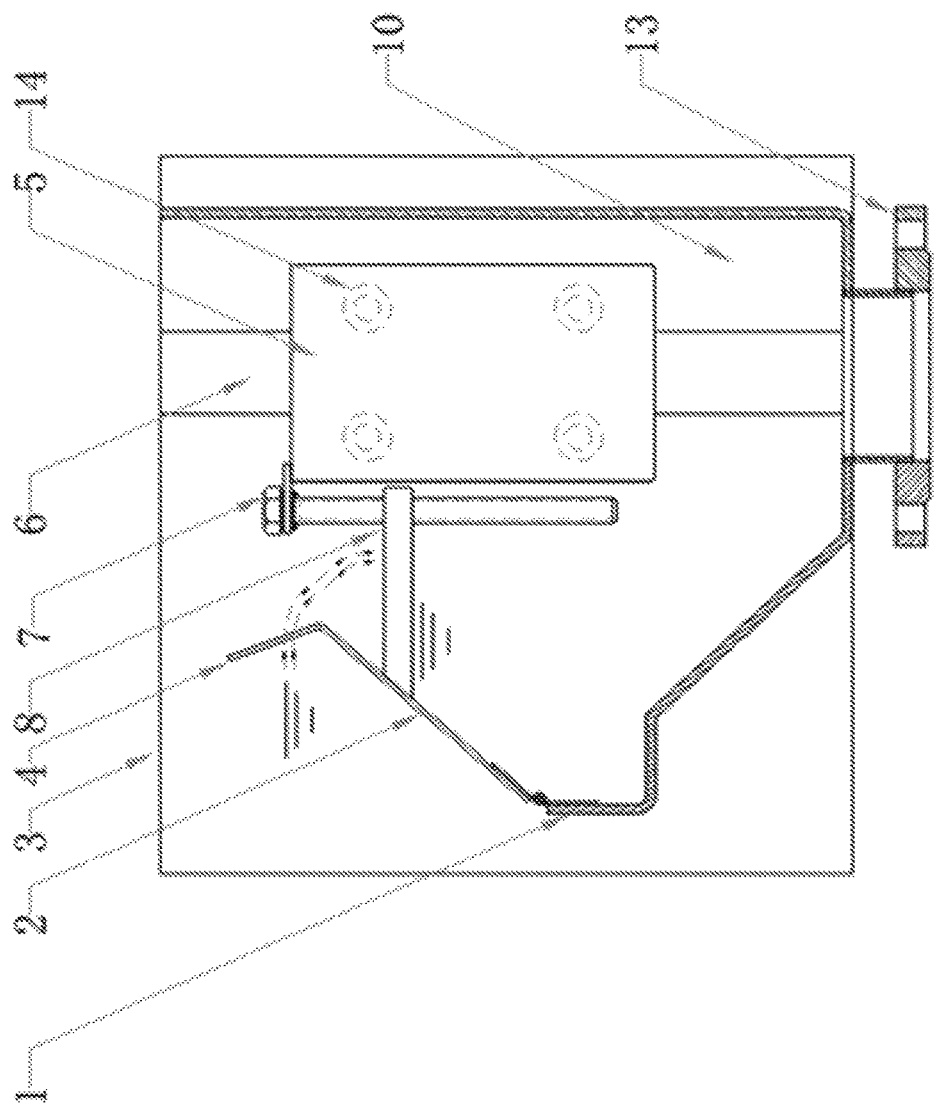
FIG. 6 is a structural diagram of a single-side floating weir skimmer.

As shown in FIG. 6, the floating weir skimmer in this embodiment is a combination of a single-side weir plate and a single inner buoy.

The collecting box 10 includes two baffle plates 3 and one trough 1. A guide rail 6 is arranged inside said trough 1. A quadrate-barrel shaped inner buoy 5 is arranged inside said collecting box 10. Both ends of said inner buoy 5 are provided with a guide pulley 14. Said inner buoy 5 floats with the help of the liquid buoyancy in said collecting box 10. The level changes in said collecting box 10 enables said inner buoy 5 to float along said guide rail 6 relying on said guide pulley 14. An adjustable bolt 7 is fixed on one side of said inner buoy 5. A carrying block 8 is arranged on said adjustable bolt 7.

One side of said inner buoy 5 is provided with a rotation plate 2. One end of said rotation plate 2 is in hinge connection with the trough 1, the other end of said rotation plate 2 is alternatively provided with the weir crests 15 and the weirs 16. Said rotation plate 2 presses on the carrying block 8 relying on its own gravity and moves with said carrying block 8 moving up and down, driving rotation of said rotation plate 2. A liquid outlet 13 is arranged at the bottom of the collecting box 10.

The above-mentioned are only preferred embodiments of the present invention. However, the protection scope of the present invention is not limited to above-mentioned embodiments. Any equivalent substitution or changes made by one of ordinary skill in the art under the teaching of the present invention falls into the protection scope of the present invention.

I claim:

1. A floating weir skimmer comprising:
   a collecting box,
   a weir plate,
   an inner buoy,
   at least two guide rails, and
   a supporting member;
   wherein said collecting box includes a liquid outlet, two baffle plates, and a trough; the baffle plates are respectfully located at both ends of the trough, so the trough being a container for an inner liquid; the liquid outlet is configured for outputting the inner liquid of the collecting box when opened;
   the guide rails are anchored inside said trough in a vertical direction;
   the inner buoy is located inside the trough between the two guide rails, floating on a surface of the inner liquid; a guide pulley assembly is arranged on each end of the inner buoy; the guide pulley assembly on each end of the trough is in contact with the guide rail and allows the inner buoy to slide along the guide rails when the surface of the inner liquid is changed;
   the supporting member is attached to a first side of the inner buoy, so that the supporting member is movable with the inner buoy when the surface of the inner liquid is changed;
   a first end of the weir plate is rotatably connected to a side edge of the trough, and a second end of the weir plate is supported by the supporting member, so that the weir plate is rotatable around the first end when the supporting member is moved with the inner buoy;
   the weir plate further comprises at least one weir opening to allow an outer scum to enter the trough.

2. The floating weir skimmer according to claim 1, wherein said weir plate comprises a rotation plate, at least one weir opening, and a weir;
   the rotation plate comprises a first rotation plate end in rotation connection with the side edge of said trough, and a second rotation plate end provided with said weir opening and said weir;
   said second rotation plate end of the rotation plate is supported by the supporting member.

3. The floating weir skimmer according to claim 1, wherein said weir plate comprises a rotation plate and a multi-opening weir plate;
   said rotation plate comprises a rotating part and a supporting part; the multi-opening weir plate is located between the rotating part and the supporting part;
   a first rotation part end of the rotation part is in rotation connection with the side edge of said trough, and a second rotation part end is connected with a first weir plate end of said multi-opening weir plate;
   the multi-opening weir plate comprises a plurality of weir openings; a second weir plate end of the multi-opening weir plate is connected to a first supporting part end of the supporting part;
   a second supporting part end of said supporting part is supported by the supporting member.

4. The floating weir skimmer according to claim 3, wherein adjacent weir openings of the plurality of weir openings are spaced by one weir along a length direction of the multi-opening weir plate.

5. The floating weir skimmer according to claim 3, wherein said supporting member comprises a adjustable bolt and a carrying block, said adjustable bolt is fixed on the inner buoy; a first block end of said carrying block is attached to said adjustable bolt, allowing the carrying block to move up and down with said adjustable bolt, and a second block end of said carrying block supports the supporting part of the rotation plate.

6. The floating weir skimmer according to claim 1, wherein the number of the weir plate is one;
   the weir plate is located at a first side of the trough, with the first end of the weir plate being connected to the first side edge of the trough; and a second side of the trough is enclosed.

7. The floating weir skimmer according to claim 1, wherein the number of the weir plate is two;
   the weir plates are located at both sides of the trough, with the first ends of the weir plates being connected to the first side edge and the second side edge, respectively.

8. The floating weir skimmer according to claim 1, wherein the number of said inner buoy is at least one.

* * * * *